United States Patent
Zhang et al.

(10) Patent No.: US 9,196,071 B2
(45) Date of Patent: Nov. 24, 2015

(54) IMAGE SPLICING METHOD AND APPARATUS

(71) Applicant: Huawei Technologies Co., Ltd., Shenzhen, Guangdong (CN)

(72) Inventors: Yifan Zhang, Hangzhou (CN); Cheng Du, Beijing (CN); Min Chen, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/496,845

(22) Filed: Sep. 25, 2014

(65) Prior Publication Data

US 2015/0154776 A1 Jun. 4, 2015

(30) Foreign Application Priority Data

Dec. 3, 2013 (CN) .......................... 2013 1 0643299

(51) Int. Cl.
| | |
|---|---|
| G06K 9/36 | (2006.01) |
| G06T 11/60 | (2006.01) |
| G06T 3/00 | (2006.01) |
| G06T 3/40 | (2006.01) |

(52) U.S. Cl.
CPC ............... *G06T 11/60* (2013.01); *G06T 3/0012* (2013.01); *G06T 3/4038* (2013.01)

(58) Field of Classification Search
None
See application file for complete search history.

(56) References Cited

U.S. PATENT DOCUMENTS

| | | | |
|---|---|---|---|
| 7,529,429 B2 | 5/2009 | Rother et al. | |
| 8,363,085 B2 | 1/2013 | Michrowski et al. | |
| 2005/0190991 A1* | 9/2005 | McCleese | 382/294 |
| 2013/0329002 A1* | 12/2013 | Tico | 348/36 |

FOREIGN PATENT DOCUMENTS

CN 103152521 A 6/2013

OTHER PUBLICATIONS

Jia, Jiaya, and Chi-Keung Tang. "Eliminating structure and intensity misalignment in image stitching." Computer Vision, 2005. ICCV 2005. Tenth IEEE International Conference on. vol. 2. IEEE, 2005.*
Jia, Jiaya, and Chi-Keung Tang. "Image stitching using structure deformation." Pattern Analysis and Machine Intelligence, IEEE Transactions on 30.4 (2008): 617-631.*

(Continued)

*Primary Examiner* — Li Liu

(57) ABSTRACT

The present invention relates to an image splicing method and apparatus. The image splicing method includes: acquiring a first image and a second image; determining a to-be-processed region within the overlapping region, where a region within the overlapping region except the to-be-processed region is a remaining region; obtaining a weight value of each adjacent pixel pair of the remaining region; setting a weight value of an adjacent pixel pair within the to-be-processed region; determining a splicing path having the least seam line intensity of all splicing paths; and performing image splicing on the first image and the second image along the optimal seam line. According to the image splicing method and apparatus of the present invention, a seam line can be excluded from a to-be-processed region, so as to ensure that the to-be-processed region is spliced naturally and to improve subjective perception of a user in viewing an image.

10 Claims, 10 Drawing Sheets

(56) References Cited

OTHER PUBLICATIONS

Tang, Yu, and Huiyan Jiang. "Highly efficient image stitching based on energy map." Image and Signal Processing, 2009. CISP'09. 2nd International Congress on. IEEE, 2009.*

Tomohiro Ozawa, et al., "Human-centric Panoramic Imaging Stitching", In Proceedings of the 3rd Augmented Human International Conference, Mar. 8-9, 2012, 6 pages.

Johannes Kiess, et al., "Seam Carving with Improved Edge Preservation", Proc. SPIE 7542, Multimedia on Mobile Devices 2010, Jan. 27, 2010, 11 pages.

Matthew Uyttendaele, et al., "Eliminating Ghosting and Exposure Artifacts in Image Mosaics", 2001 IEEE, Dec. 8, 2001, p. 509-516.

Michael Rubinstein, et al., "Improved Seam Carving for Video Retargeting", Jan. 1, 2008, 9 pages.

Shai Avidan, et al., "Seam Carving for Content-Aware Image Resizing", ACM Transactions on Graphics, vol. 26, No. 3, Article 10, Jul. 2007, 9 pages.

Zhenhua Qu, et al., "Detect Digital Image Splicing with Visual Cues", Jun. 8, 2009, p. 247-261.

* cited by examiner

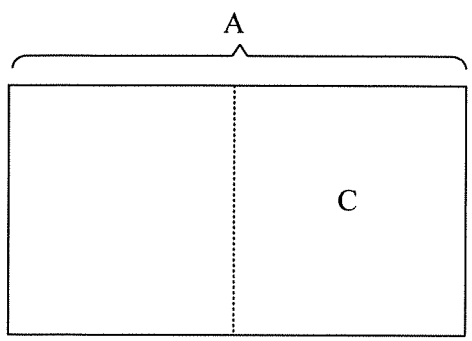
FIG. 2
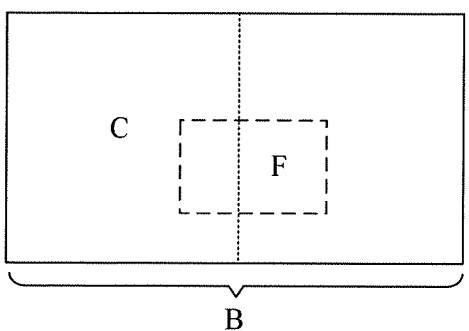
FIG. 3a
FIG. 3b

  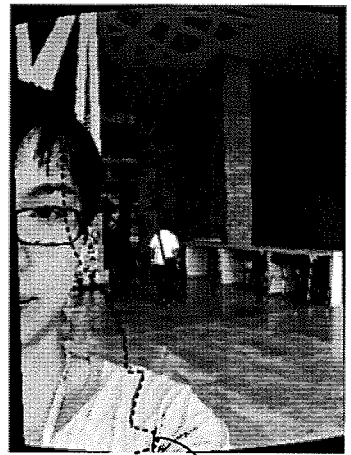
FIG. 9a  FIG. 9b  FIG. 9c
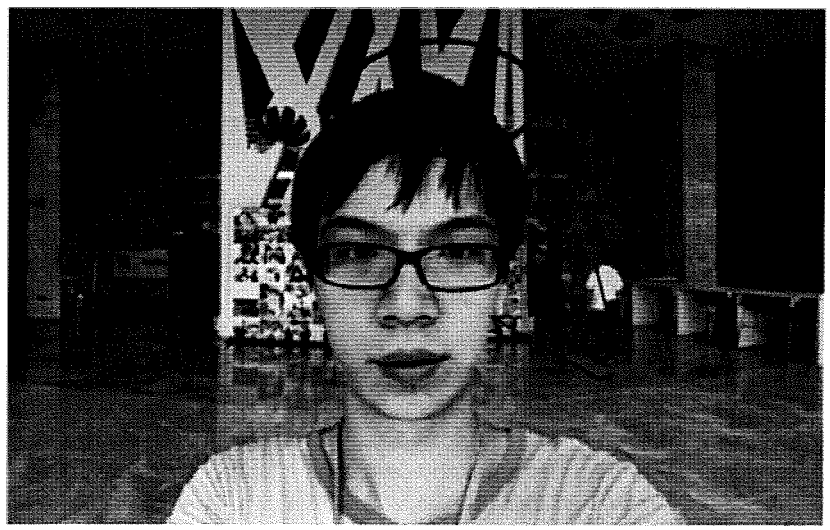
FIG. 9d

  
FIG. 10a    FIG. 10b    FIG. 10c
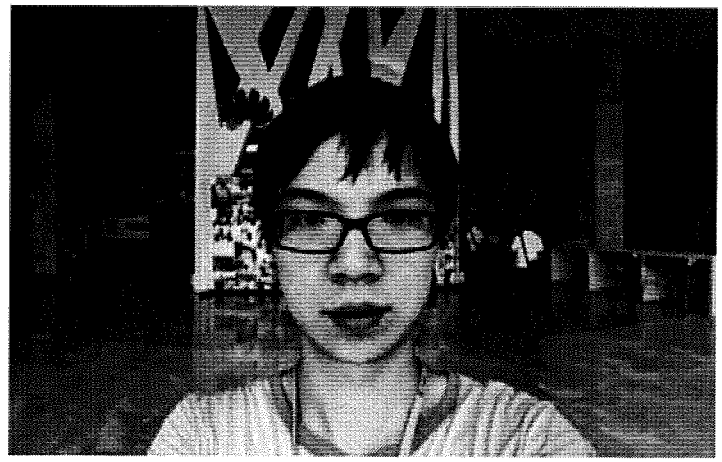
FIG. 10d

IMAGE SPLICING METHOD AND APPARATUS

CROSS-REFERENCE TO RELATED APPLICATIONS

This application claims priority to Chinese Patent Application No. 201310643299.8, filed with the Chinese Patent Office on Dec. 3, 2013, which is incorporated herein by reference in its entirety.

TECHNICAL FIELD

The present invention relates to the image processing field, and in particular, to an image splicing method and apparatus.

BACKGROUND

An image splicing technology includes two key stages, namely, image registration and image blending. The objective of image registration is to find a transformation relationship between two or more images having an overlapping region, establish a mathematical model of image coordinate transformation, and transform a plurality of images into one coordinate system by solving parameters of the model. An image blending technology is used to solve a problem of inaccurate registration caused by geometric correction, a dynamic scene, or a lighting change, and combine adjacent images into one image.

An optimal seam line technology is used in the prior art during an image blending process. One optimal seam line is found in an overlapping region of a plurality of images, so as to minimize an energy difference between two images on the seam line. In this way, during image splicing, pixels of different images are separately acquired on two sides of the seam line, which effectively solves a problem of discontinuous luminance and color or image blurring of a moving object caused by inaccurate registration.

However, when the optimal seam line occurs in a region of importance (English: Region of interest, ROI for short) to be presented by an image, for example, a face region, face deformation in the image may be caused, and a visual effect of an image obtained after splicing is poor.

SUMMARY

Technical Problem

In view of this, a technical problem to be solved by the present invention is a problem of deformation of a region of importance in an image and a poor visual effect caused due to occurrence of an optimal seam line in the region of importance.

Solution

In order to solve the technical problem, according to an embodiment of the present invention, a first aspect provides an image splicing method, including:

acquiring a first image and a second image, where an overlapping region exists between the first image and the second image;

determining a to-be-processed region within the overlapping region, where a region within the overlapping region except the to-be-processed region is a remaining region;

acquiring a luminance component or chrominance component of each pixel of the remaining region, and obtaining a weight value of each adjacent pixel pair of the remaining region according to luminance components or chrominance components of all the pixels of the remaining region;

setting a weight value of each adjacent pixel pair within the to-be-processed region, where a weight value of any adjacent pixel pair of the to-be-processed region is greater than a weight value of any adjacent pixel pair of the remaining region;

determining a splicing path having the least seam line intensity of all splicing paths within the overlapping region as an optimal seam line, where the seam line intensity is a sum of weight values of all adjacent pixel pairs that the splicing path goes through; and performing image splicing on the first image and the second image along the optimal seam line.

In a possible implementation manner, the setting a weight value of each adjacent pixel pair within the to-be-processed region includes:

selecting the largest weight value of weight values of all the adjacent pixel pairs within the remaining region; and setting the weight value of each adjacent pixel pair within the to-be-processed region to be greater than the largest weight value.

In a possible implementation manner, the setting a weight value of each adjacent pixel pair within the to-be-processed region includes:

acquiring a luminance component or chrominance component of each pixel of the to-be-processed region, and obtaining a weight value of each adjacent pixel pair of the to-be-processed region according to luminance components or chrominance components of all the pixels of the to-be-processed region;

selecting the largest weight value of weight values of all the adjacent pixel pairs within the remaining region and all adjacent pixel pairs within the to-be-processed region; and setting the weight value of each adjacent pixel pair within the to-be-processed region to be greater than the largest weight value.

In a possible implementation manner, the determining a to-be-processed region within the overlapping region includes:

determining the to-be-processed region according to a preset size within the overlapping region, where a size of the to-be-processed region is the same as the preset size.

In a possible implementation manner, the determining a to-be-processed region within the overlapping region includes:

determining a position and size of a face region in the first image, and determining a position and size of a face region in the second image; and determining the to-be-processed region within the overlapping region according to the position and size of the face region in the first image and the position and size of the face region in the second image.

In order to solve the technical problem, according to another embodiment of the present invention, a second aspect provides an image splicing apparatus, including:

an acquiring module, configured to acquire a first image and a second image, where an overlapping region exists between the first image and the second image;

a first determining module, connected to the acquiring module and configured to determine a to-be-processed region within the overlapping region, where a region within the overlapping region except the to-be-processed region is a remaining region;

a calculating module, connected to the first determining module and configured to acquire a luminance component or chrominance component of each pixel of the remaining region, and obtain a weight value of each adjacent pixel pair of the remaining region according to luminance components or chrominance components of all the pixels of the remaining region;

a setting module, connected to the calculating module and configured to set a weight value of each adjacent pixel pair within the to-be-processed region, where a weight value of any adjacent pixel pair of the to-be-processed region is greater than a weight value of any adjacent pixel pair of the remaining region;

a second determining module, connected to the setting module and configured to determine a splicing path having the least seam line intensity of all splicing paths within the overlapping region as an optimal seam line, where the seam line intensity is a sum of weight values of all adjacent pixel pairs that the splicing path goes through; and a splicing module, connected to the second determining module and configured to perform image splicing on the first image and the second image along the optimal seam line.

In a possible implementation manner, the setting module is configured to:

select the largest weight value of weight values of all the adjacent pixel pairs within the remaining region; and set the weight value of each adjacent pixel pair within the to-be-processed region to be greater than the largest weight value.

In a possible implementation manner, the calculating module is configured to:

acquire a luminance component or chrominance component of each pixel of the to-be-processed region, and obtain a weight value of each adjacent pixel pair of the to-be-processed region according to luminance components or chrominance components of all the pixels of the to-be-processed region; and the setting module is configured to:

select the largest weight value of weight values of all the adjacent pixel pairs within the remaining region and all adjacent pixel pairs within the to-be-processed region; and set the weight value of each adjacent pixel pair within the to-be-processed region to be greater than the largest weight value.

In a possible implementation manner, the first determining module is configured to:

determine the to-be-processed region according to a preset size within the overlapping region, where a size of the to-be-processed region is the same as the preset size.

In a possible implementation manner, the first determining module is configured to:

determine a position and size of a face region in the first image, and determine a position and size of a face region in the second image; and determine the to-be-processed region within the overlapping region according to the position and size of the face region in the first image and the position and size of the face region in the second image.

Beneficial Effect

A to-be-processed region is determined within an overlapping region, and a weight value of each adjacent pixel pair is set within the to-be-processed region. According to the image splicing method and apparatus of the embodiments of the present invention, a seam line can be excluded from the to-be-processed region during splicing, so as to ensure that the to-be-processed region is spliced more naturally and to improve subjective perception of a user in viewing an image.

Exemplary embodiments are described in detail with reference to accompanying drawings to make other features and aspects of the present invention clearer.

BRIEF DESCRIPTION OF DRAWINGS

Accompanying drawings included in the specification and constructing a part of the specification and the specification jointly show exemplary embodiments, features and aspects of the present invention, and are intended to explain the principles of the present invention.

FIG. 2 is a schematic diagram of feature extraction in an image splicing method according to an embodiment of the present invention;

FIG. 3a to FIG. 3c are schematic diagrams of a face region in an image splicing method according to an embodiment of the present invention;

FIG. 9a to FIG. 9d show schematic diagrams of an effect of performing synthesis by using the prior art after panoramic photo shooting;

FIG. 10a to FIG. 10d show schematic diagrams of an effect of an image splicing method provided by an embodiment of the present invention;

DESCRIPTION OF EMBODIMENTS

The following describes, with reference to the accompanying drawings, various exemplary embodiments, features, and aspects of the present invention in detail. A same mark in the accompanying drawings indicates a same function or a similar component. Though various aspects of the embodiments are shown in the accompanying drawings, unless otherwise specified, the accompanying drawings do not need to be drawn proportionally.

The specific term "exemplary" herein means "used as an example or embodiment or illustrative". Any embodiment described as "exemplary" is not necessarily explained as being superior or better than other embodiments.

In addition, for better description of the present invention, a lot of specific details are provided in the following specific implementation manners. A person of ordinary skill in the art should understand that the present invention may also be implemented without the specific details. In some embodiments, methods, means, components, and circuits known to a person skilled in the art are not described in detail for the convenience of highlighting the major idea of the present invention.

Figure 1:
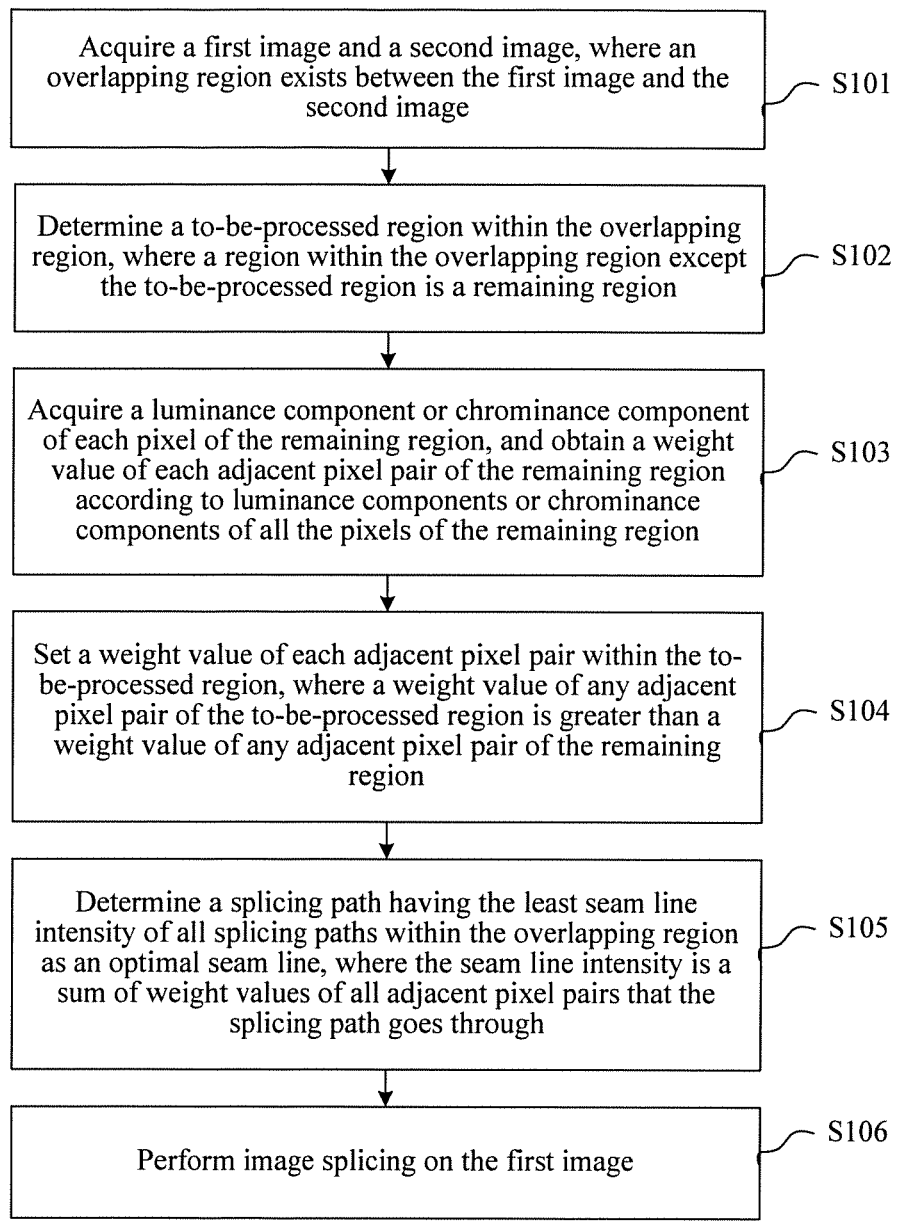
FIG. 1 is a flowchart of an image splicing method according to an embodiment of the present invention.

FIG. 1 is a flowchart of an image splicing method according to an embodiment of the present invention. As shown in FIG. 1, the method mainly includes:

Step S101: Acquire a first image and a second image, where an overlapping region exists between the first image and the second image.

Step S102: Determine a to-be-processed region within the overlapping region, where a region within the overlapping region except the to-be-processed region is a remaining region.

Specifically, the to-be-processed region within the overlapping region may be determined in any one of the following manners:

Manner 1: Determine the to-be-processed region according to a preset size within the overlapping region, where a size of the to-be-processed region is the same as the preset size.

For example, a user selects a certain ROI on an image by using a window with a size of 3 mm*3 mm, for example, selects an ROI that includes a scene such as a "flower", a "mountain", and an "animal" as the to-be-processed region.

Manner 2: Determine a position and size of a face region in the first image, and determine a position and size of a face region in the second image; and determine the to-be-processed region within the overlapping region according to the position and size of the face region in the first image and the position and size of the face region in the second image.

For example, when a photo of people is taken, a face detection function of a shooting device may be enabled, so as to perform multi-scale traversal face-scanning by using a window on a shot image. The multi-scale traversal face-scanning may be performed in two manners:

(1) Perform multi-scale zooming on a to-be-scanned image by using a face-scanning window with a fixed size.

(2) Perform multi-scale zooming on a face-scanning window, where a size of a to-be-scanned image is fixed.

In an example in which a size of a face-scanning window is fixed, it is assumed that a scanning window is an n*n rectangular region. First, full-image scanning is performed according to a certain step when a size of a to-be-scanned image is of a certain scale. A Haar feature is extracted from each face-scanning window. As shown in FIG. 2, a Haar feature generally refers to a difference between a sum of white rectangular pixels and a sum of black rectangular pixels. The obtained Haar feature is input into cascaded classifiers, where each layer of classifier may exclude some negative samples (non-face regions in the to-be-scanned image), so that positive samples (face regions of the image at the scale) are eventually obtained. The face-scanning window is recorded if it is a face region, until images are completely scanned at the scale. Because the to-be-scanned image is zoomed into a plurality of different scales, corresponding positive samples may be obtained at each scale, and the obtained positive samples may be restored according to a scale of an original image. Then, window combination is performed on a plurality of positive samples obtained by scanning, so as to obtain a final position and size of a face region of the image.

Figure 3C:
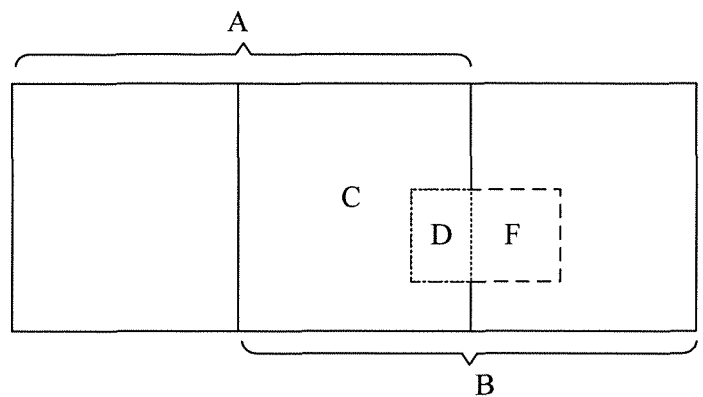

After the face region of the shot image is determined by using the face detection function, in an overlapping region of two images, a to-be-processed region may be obtained by performing conversion in the overlapping region according to positions and sizes of face regions. Generally, a face region may be determined in an image by using a face detection function only if the image has a complete human face. No face region can be determined for a partial human face. As shown in FIG. 3a to FIG. 3c, two images having an overlapping region are an image A and an image B, where a face region F is determined in the image B and no face region exists in the image A. In this case, a to-be-processed region D may be determined in the overlapping region C according to a position and size of the face region F of the image B.

Step S103: Acquire a luminance component or chrominance component of each pixel of the remaining region, and obtain a weight value of each adjacent pixel pair of the remaining region according to luminance components or chrominance components of all the pixels of the remaining region.

Figure 4:
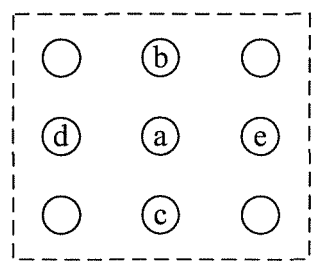
FIG. 4 is a schematic diagram of adjacent pixel pairs in an image splicing method according to an embodiment of the present invention.

Specifically, FIG. 4 is a schematic diagram of adjacent pixel pairs in an image splicing method according to an embodiment of the present invention. As shown in FIG. 4, a pixel a forms an adjacent pixel pairs with pixels b, c, d, and e in positions respectively at the top, bottom, left, and right of the pixel a. For a weight value of an adjacent pixel pair at an edge of the overlapping region, reference may be made to a formula (1):

$$E(f) = E_{smooth}(f) + E_{data}(f) \quad (1)$$

In the formula (1), E(f) represents a weight value of an adjacent pixel pair at an edge of an overlapping region. A value of $E_{data}(f)$ is generally ∞, which can ensure that a seam line does not exceed the edge of the overlapping region; a value of $E_{smooth}(f)$ may be dependent upon a color intensity of the adjacent pixel pair, where reference may be specifically made to a formula (2):

$$E_{smooth}(f) = \|A(s) - B(s)\| + \|A(t) - B(t)\| \quad (2)$$

where, s and t represent serial numbers of adjacent pixels in the overlapping region; A(s) and B(s) are pixel values corresponding to a pixel s in the overlapping region in two images; and A(t) and B(t) are pixel values corresponding to a pixel t in the overlapping region in the two images. In this embodiment of the present invention, a pixel value of a pixel in an image may be represented by a square of a difference between pixel values of R, G, and B channels of the pixel, and may be understood as a color intensity in this embodiment. Therefore, for a weight value of an adjacent pixel pair within the overlapping region (excluding pixels at edges of the overlapping region), reference may be made to a method for calculating $E_{smooth}(f)$ in the formula (2).

As shown in FIG. 5a to FIG. 5d, FIG. 5a to FIG. 5d are diagrams of weights of a part of adjacent pixel pairs in an image splicing method according to an embodiment of the present invention. A weight diagram is generated according to a weight value, which is obtained in this step, of each adjacent pixel pair of the remaining region, where for a method for calculating a weight value of an adjacent pixel pair, reference may be specifically made to the formula (2).

Step S104: Set a weight value of each adjacent pixel pair within the to-be-processed region, where a weight value of any adjacent pixel pair of the to-be-processed region is greater than a weight value of any adjacent pixel pair of the remaining region.

In a possible implementation manner, the setting a weight value of an adjacent pixel pair within the to-be-processed region may specifically include any one of the following methods:

Method 1: Select the largest weight value within the remaining region and set the weight value of each adjacent pixel pair within the to-be-processed region, which may specifically include:

acquiring a luminance component or chrominance component of each pixel of the remaining region, and obtaining a weight value of each adjacent pixel pair of the remaining region according to luminance components or chrominance components of all the pixels of the remaining region;

selecting the largest weight value of weight values of all the adjacent pixel pairs within the remaining region; and setting the weight value of each adjacent pixel pair within the to-be-processed region to be greater than the largest weight value.

Figure 5A:
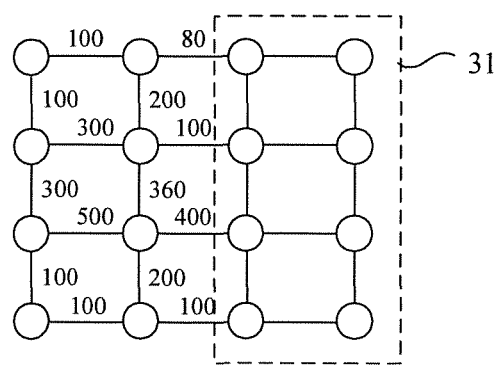
FIG. 5a to FIG. 5d are diagrams of weights of a part of adjacent pixel pairs in an image splicing method according to an embodiment of the present invention.
Figure 5B:
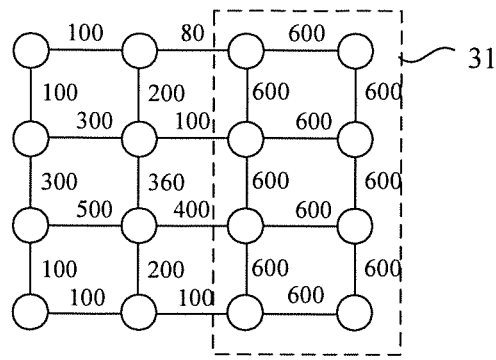

Referring to FIG. 5a, it may only calculate weight values of the remaining region, and select the largest value, which is "500", of the weight values from the remaining region. As shown in FIG. 5b, a weight value of an adjacent pixel pair within a to-be-processed region 31 may be set to be greater than the largest weight value "500" of the remaining region, for example, may be set to "600".

Method 2: Select the largest weight value of the whole overlapping region (including the remaining region and the to-be-processed region) and set the weight value of each adjacent pixel pair of the to-be-processed region, which may specifically include:

acquiring a luminance component or chrominance component of each pixel of the to-be-processed region, and obtaining a weight value of each adjacent pixel pair of the to-be-processed region according to luminance components or chrominance components of all the pixels of the to-be-processed region;

selecting the largest weight value of weight values of all the adjacent pixel pairs within the remaining region and all adjacent pixel pairs within the to-be-processed region; and setting the weight value of each adjacent pixel pair within the to-be-processed region to be greater than the largest weight value.

Figure 5C:
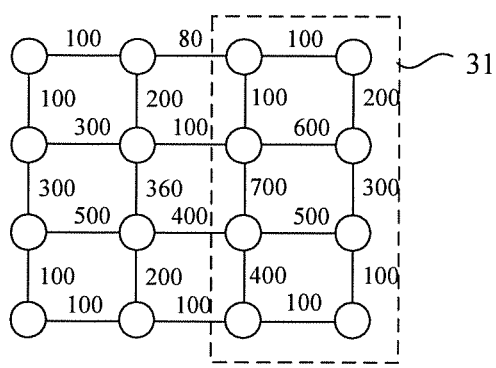
Figure 5D:
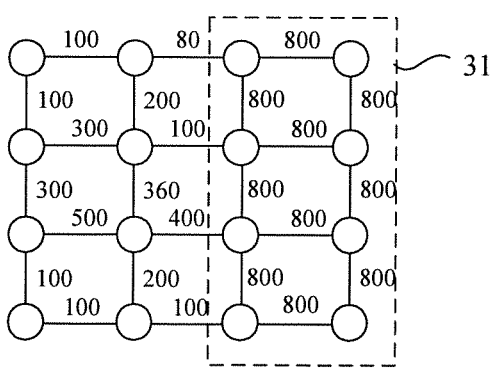

Referring to FIG. 5c, weight values of all adjacent pixel pairs of the whole overlapping region (including the remaining region and the to-be-processed region) may be calculated; the largest value "700" is selected from the overlapping region; and a weight value of an adjacent pixel pair within the to-be-processed region 31 may be set to be greater than "700", and as shown in FIG. 5d, may be set to "800".

Method 3: Set, according to empirical values, a weight value of an adjacent pixel pair within the to-be-processed region to a weight value that cannot be exceeded in a normal situation, for example, "1000".

Step S105: Determine a splicing path having the least seam line intensity of all splicing paths within the overlapping region as an optimal seam line, where the seam line intensity is a sum of weight values of all adjacent pixel pairs that the splicing path goes through.

Image splicing may be based on a principle of an optimal seam line. The optimal seam line is based on an image cutting algorithm in essence. In computer vision, a problem of how to perform image segmentation occurs frequently, which actually is also a minimizing problem. Specifically, a seam line refers to a splicing path that may be selected to splice an overlapping region of two images, and an optimal seam line is a splicing path having the least seam line intensity and selected from a plurality of seam lines. A seam line intensity is a sum of weight values of adjacent pixel pairs that a splicing path goes through.

Figure 6:
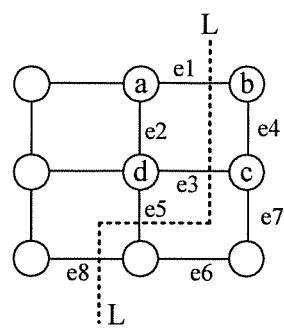
FIG. 6 is a schematic diagram of determining an optimal seam line in an image splicing method according to an embodiment of the present invention.

An optimal seam line may be determined by using a plurality of methods. For example, starting from the first line of the overlapping region, a seam line using each two pixels on the line as a starting point may be established, and one optimal seam line may be found from these seam lines eventually. As shown in FIG. 6, FIG. 6 is a schematic diagram of determining an optimal seam line in an image splicing method according to an embodiment of the present invention, where a weight value corresponding to a pair of adjacent pixels a and b of the first line is used as an initial value of the seam line intensity, and the optimal seam line extends downwards from the pixel pair of the first line to the last line. An extending method may be as follows: Referring to FIG. 6, for the pixel pair ab, there are three possible extension directions for downward extension: a pixel pair ad, a pixel pair dc, and a pixel pair bc; sums of weight values corresponding to ab and ad, ab and dc, and ab and bc are separately calculated and three seam line intensities may be obtained, where the three seam line intensities are separately corresponding to three extension directions of the seam line; then, calculation continues to be performed line by line based on the three seam lines, so that a plurality of seam lines may be obtained when calculation on the last line is performed, and a seam line having the least seam line intensity may be selected as the optimal seam line from the plurality of seam lines. Referring to FIG. 6, if L going through pixels ab, dc, de, and ge has the least seam line intensity, L may be selected as the optimal seam line.

Step S106: Perform image splicing on the first image and the second image along the optimal seam line.

Because weight values of adjacent pixel pairs within a to-be-processed region are relatively large, and an intensity of a seam line going through the to-be-processed region is relatively large, a seam line going through the to-be-processed region may be excluded when an optimal seam line is selected.

Figure 7:
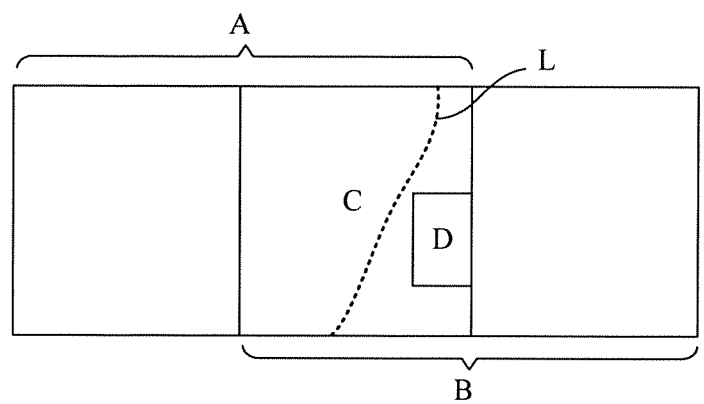
FIG. 7 is a schematic diagram of splicing two images in an image splicing method according to an embodiment of the present invention.

As shown in FIG. 7, FIG. 7 is a schematic diagram of splicing two images in an image splicing method according to an embodiment of the present invention, where an image A is on the left, an image B is on the right, an overlapping region is C, a to-be-processed region is D, and along an optimal seam line L, pixels to the left of L in the overlapping region C of the image A and pixels to the right of L in the overlapping region of the image B may be selected, so as to splice the image A and the image B together. Because the optimal seam line L selected in step S104 does not occur in the to-be-processed region D, referring to FIG. 7, a splicing line of the two images A and B also does not occur in the to-be-processed region D.

According to this embodiment of the present invention, a weight value of an adjacent pixel pair within a to-be-processed region is set, so as to exclude the to-be-processed region when images are spliced at an overlapping region, which avoids deformation of the to-be-processed region, for example, a face region, due to occurrence of a seam line, so as to ensure that a spliced image is more natural and improve a visual effect of image splicing.

Figure 8:
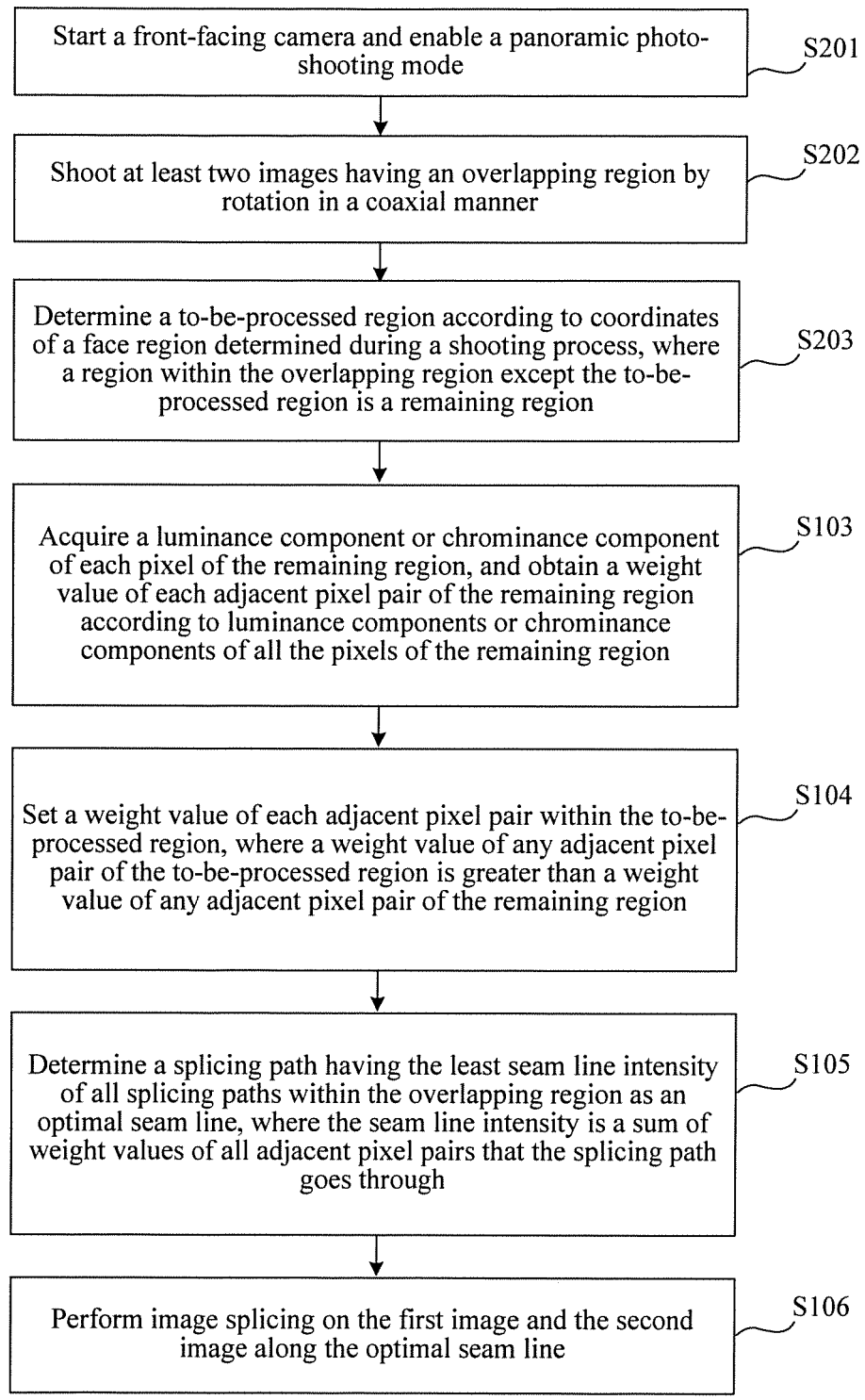
FIG. 8 is a flowchart of an image splicing method according to another embodiment of the present invention.

FIG. 8 is a flowchart of an image splicing method according to another embodiment of the present invention. As shown in FIG. 8, on the basis of the foregoing embodiment, the method may further include:

Step S201: Start a camera and enable a panoramic photo-shooting mode.

Specifically, the camera may be a front-facing camera or a rear-facing camera of a mobile phone, a tablet computer, a notebook computer, or the like, or a camera of a shooting device. Generally, two photos taken consecutively in the panoramic mode have an overlapping region.

Step S202: Shoot at least two images having an overlapping region by rotation in a coaxial manner.

When a rear-facing camera of a mobile phone or a camera of a shooting device is used to shoot a scene or a broad region, a shooting target is far away from a lens of the camera; a shooting person holding a device may move along an arc relative to the scene to shoot a plurality of images having overlapping regions.

When a terminal device having a front-facing camera is used for shooting, for example, a camera of a mobile phone is used to take a selfie of the shooting person, the front-facing camera is near the face. In this case, a foreground and a background cannot be considered as on a same plane, and impact of parallax may be caused when the camera is moved in an arc direction to shoot an image, resulting in that relative positions of a foreground and a background of each photo change obviously, which is more likely to cause an error during splicing. Therefore, the images may be shot by rotation in a coaxial manner. Rotation in a coaxial manner may be that the shooting person slowly rotates a device by using a hand holding the device as an axis, and shoots images during rotation.

A face detection function of the device may also be enabled during shooting. In an example in which a front-facing camera shoots images during a coaxial rotation process, step S202 may specifically include:

Step S2021: The device detects whether a face feature exists in an image, where reference may be made to FIG. 3a to FIG. 3c and the related descriptions of FIG. 3a to FIG. 3c.

Step S2022: The device records coordinates of a face region if the face feature exists.

Step S2023: During a process in which the shooting person holds the device and rotates the device in a coaxial manner, the device may control the front-facing camera to shoot an image if the device detects that the face is in a preferable position; then, the device may further control the front-facing camera to shoot an image if the device detects that the face is in a preferable position and a certain region overlapping the previous image exists; and stops shooting until the number of the shot images reaches a preset upper limit (for example, a maximum of five images can be shot) or the user determines that the shooting is complete, and then a subsequent image splicing stage may be started.

For a specific image splicing process, reference may be made to the related description of the foregoing embodiment. During the splicing process, if a to-be-processed region is determined by using the coordinates of the face region, step S102 may specifically include:

Step S203: Determine a to-be-processed region according to the coordinates of the face region determined during the foregoing shooting process, where a region within the overlapping region except the to-be-processed region is a remaining region.

Then, step S103 to step S106 may be executed to separately splice each two images having an overlapping region. Eventually, all shot images may be spliced together to obtain a complete panorama.

In the image splicing method according to this embodiment, a weight value of an adjacent pixel pair within a to-be-processed region is set, so as to exclude the to-be-processed region when images are spliced at an overlapping region, which avoids deformation of the to-be-processed region, for example, a face region, due to occurrence of a seam line, so as to ensure that a spliced image is more natural and improve a visual effect of image splicing. Further, if the image splicing method is applied in a panoramic photo-shooting mode of a front-facing camera, a visual region of the front-facing camera can be greatly expanded; moreover, by using rotation in a coaxial manner, an image splicing error caused by parallax can be reduced and image splicing quality is improved.

FIG. 9a to FIG. 9d show schematic diagrams of an effect of performing synthesis by using the prior art after panoramic photo shooting. As shown in FIG. 9a to FIG. 9d, when three pictures are synthesized into one panorama photo, because a position of a selected optimal seam line L goes through a face region, defects, such as splicing misalignment and blurring, may be caused in the face region (a position marked by an ellipse in FIG. 9d), resulting in a poor visual effect. FIG. 10a to FIG. 10d show schematic diagrams of an effect of an image splicing method provided by an embodiment of the present invention. As shown in FIG. 10a to FIG. 10d, when three pictures are synthesized into one panorama photo, an optimal seam line L excludes a face region, and face regions are spliced without defects, which produces a better visual effect.

Figure 11:
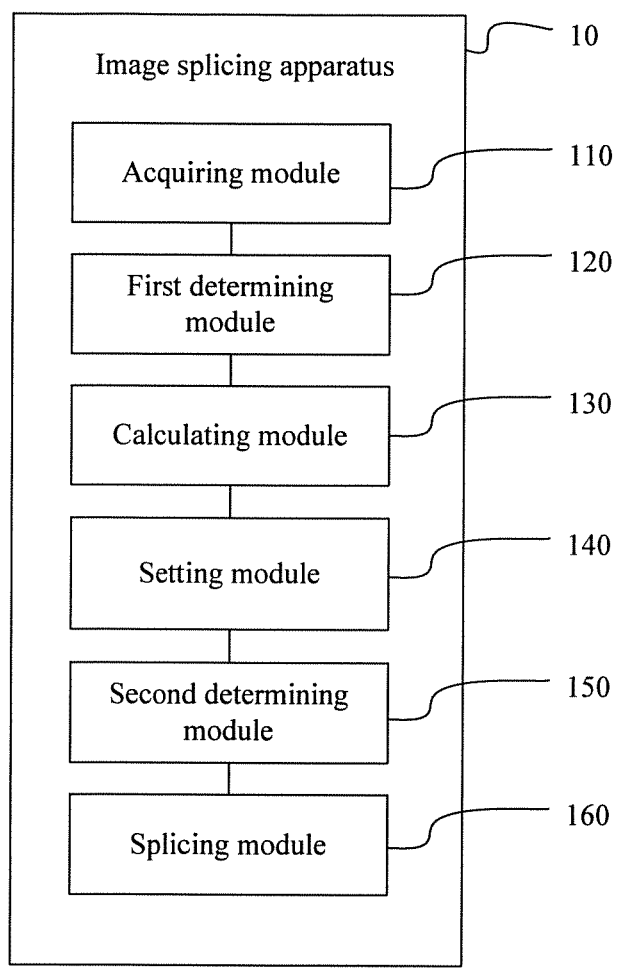
FIG. 11 is a schematic structural diagram of an image splicing apparatus according to an embodiment of the present invention.

FIG. 11 is a schematic structural diagram of an image splicing apparatus according to an embodiment of the present invention. As shown in FIG. 11, the apparatus 10 may include an acquiring module 110, a first determining module 120, a calculating module 130, a setting module 140, a second determining module 150, and a splicing module 160.

The acquiring module 110 is configured to acquire a first image and a second image, where an overlapping region exists between the first image and the second image.

The first determining module 120 is connected to the acquiring module 110 and configured to determine a to-be-processed region within the overlapping region, where a region within the overlapping region except the to-be-processed region is a remaining region.

The calculating module 130 is connected to the first determining module 120 and configured to acquire a luminance component or chrominance component of each pixel of the remaining region, and obtain a weight value of each adjacent pixel pair of the remaining region according to luminance components or chrominance components of all the pixels of the remaining region.

The setting module 140 is connected to the calculating module 130 and configured to set a weight value of each adjacent pixel pair within the to-be-processed region, where a weight value of any adjacent pixel pair of the to-be-processed region is greater than a weight value of any adjacent pixel pair of the remaining region.

The second determining module 150 is connected to the setting module 140 and configured to determine a splicing path having the least seam line intensity of all splicing paths within the overlapping region as an optimal seam line, where the seam line intensity is a sum of weight values of all adjacent pixel pairs that the splicing path goes through.

The splicing module 160 is connected to the second determining module 150 and configured to perform image splicing on the first image and the second image along the optimal seam line.

Specifically, for an example in which the acquiring module 110 acquires the first image and the second image, reference may be made to FIG. 8 and the related description of FIG. 8. For a specific process in which the first determining module 120 determines the to-be-processed region within the overlapping region, reference may be made to the related description of step S104 in the foregoing method embodiment. For a method for calculating a weight value of a pixel pair by the calculating module 130, reference may be made to the formula (1), the formula (2), and the related description of the formula (1) and the formula (2) in step S103 in the foregoing method embodiment. For setting a weight value of each adjacent pixel pair within the to-be-processed region by the setting module 140, reference may be specifically made to the related description of method 1 to method 3 in step S104 in the foregoing method embodiment. For specific principles of determining an optimal seam line by the second determining module 150 and specific principles of performing image splicing on the first image and the second image along the optimal seam line by the splicing module 160, reference may be made to FIG. 6, FIG. 7, and the related description of FIG. 6 and FIG. 7 in the foregoing method embodiment.

In a possible implementation manner, the setting module 140 is configured to: select the largest weight value of weight values of all the adjacent pixel pairs within the remaining region; and set the weight value of each adjacent pixel pair within the to-be-processed region to be greater than the largest weight value. Reference may be specifically made to the related descriptions of method 1 in step S104, FIG. 5a, and FIG. 5b in the foregoing method embodiment.

In a possible implementation manner, the calculating module 130 is configured to: acquire a luminance component or chrominance component of each pixel of the to-be-processed region, and obtain a weight value of each adjacent pixel pair of the to-be-processed region according to luminance components or chrominance components of all the pixels of the to-be-processed region; and the setting module 140 is configured to: select the largest weight value of weight values of all the adjacent pixel pairs within the remaining region and all adjacent pixel pairs within the to-be-processed region; and set the weight value of each adjacent pixel pair within the to-be-processed region to be greater than the largest weight value. Reference may be specifically made to the related descriptions of method 2 in step S104, FIG. 5c, and FIG. 5d in the foregoing method embodiment.

In a possible implementation manner, the first determining module 120 is configured to: determine the to-be-processed region according to a preset size within the overlapping region, where a size of the to-be-processed region is the same as the preset size. Reference may be specifically made to the related description of manner 1 in step S102 in the foregoing method embodiment.

In a possible implementation manner, the first determining module 120 is configured to: determine a position and size of a face region in the first image, and determine a position and size of a face region in the second image; and determine the to-be-processed region within the overlapping region according to the position and size of the face region in the first image and the position and size of the face region in the second image. Reference may be specifically made to the related description of manner 2 in step S102 in the foregoing method embodiment.

A to-be-processed region is determined within an overlapping region, and a weight value of each adjacent pixel pair is set within the to-be-processed region. According to the image splicing apparatus of this embodiment of the present invention, a seam line can be excluded from the to-be-processed region during splicing, so as to ensure that the to-be-processed region is spliced more naturally and to improve subjective perception of a user in viewing an image.

Figure 12:
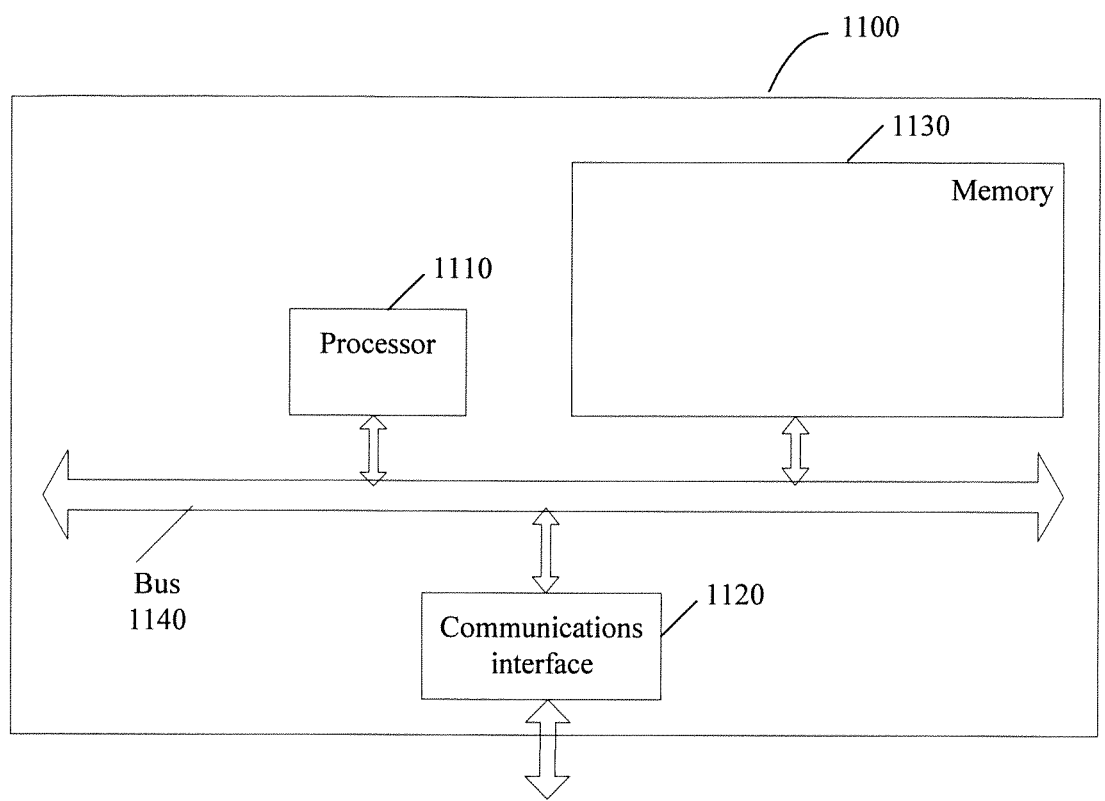
FIG. 12 is a structural block diagram of an image splicing apparatus according to another embodiment of the present invention.

FIG. 12 shows a structural block diagram of an image splicing apparatus according to another embodiment of the present invention. The image splicing apparatus 1100 may be a host server having a computing capability, a personal computer PC, a portable computer, a terminal, or the like. Specific embodiments of the present invention set no limitation on specific implementations of a computing node.

The image splicing apparatus 1100 includes a processor (processor) 1110, a communications interface (Communications Interface) 1120, a memory (memory) 1130, and a bus 1140. The processor 1110, the communications interface 1120, and the memory 1130 communicate with each other by using the bus 1140.

The communications interface 1120 is configured to communicate with a network device, where the network device includes, for example, a virtual machine management center, and a shared memory.

The processor 1110 is configured to execute a program. The processor 1110 may be a central processing unit CPU or an application specific integrated circuit ASIC (Application Specific Integrated Circuit), or be configured to be one or more integrated circuits implementing the embodiments of the present invention.

The memory 1130 is configured to store a file. The memory 1130 may include a high-speed RAM memory, and may also include a nonvolatile storage (non-volatile memory), for example, at least one disk memory. The memory 1130 may also be a memory array. The memory 1130 may also be divided into blocks, where the blocks may be combined to form a virtual volume according to a specific rule.

In a possible implementation manner, the program may be program code including computer operation instructions, and the program may be specifically used to:

acquire a first image and a second image, where an overlapping region exists between the first image and the second image;

determine a to-be-processed region within the overlapping region, where a region within the overlapping region except the to-be-processed region is a remaining region;

acquire a luminance component or chrominance component of each pixel of the remaining region, and obtain a weight value of each adjacent pixel pair of the remaining region according to luminance components or chrominance components of all the pixels of the remaining region;

set a weight value of each adjacent pixel pair within the to-be-processed region, where a weight value of any adjacent pixel pair of the to-be-processed region is greater than a weight value of any adjacent pixel pair of the remaining region;

determine a splicing path having the least seam line intensity of all splicing paths within the overlapping region as an optimal seam line, where the seam line intensity is a sum of weight values of all adjacent pixel pairs that the splicing path goes through; and perform image splicing on the first image and the second image along the optimal seam line.

In a possible implementation manner, for the setting a weight value of each adjacent pixel pair within the to-be-processed region, the program may be specifically used to:

selecting the largest weight value of weight values of all the adjacent pixel pairs within the remaining region; and setting the weight value of each adjacent pixel pair within the to-be-processed region to be greater than the largest weight value.

In a possible implementation manner, for the setting a weight value of each adjacent pixel pair within the to-be-processed region, the program may be specifically used to:

acquiring a luminance component or chrominance component of each pixel of the to-be-processed region, and obtaining a weight value of each adjacent pixel pair of the to-be-processed region according to luminance components or chrominance components of all the pixels of the to-be-processed region;

selecting the largest weight value of weight values of all the adjacent pixel pairs within the remaining region and all adjacent pixel pairs within the to-be-processed region; and setting the weight value of each adjacent pixel pair within the to-be-processed region to be greater than the largest weight value.

In a possible implementation manner, for the determining a to-be-processed region within the overlapping region, the program may be specifically used to:

determining the to-be-processed region according to a preset size within the overlapping region, where a size of the to-be-processed region is the same as the preset size.

In a possible implementation manner, for the determining a to-be-processed region within the overlapping region, the program may be specifically used to:

determining a position and size of a face region in the first image, and determining a position and size of a face region in the second image; and determining the to-be-processed region within the overlapping region according to the position and size of the face region in the first image and the position and size of the face region in the second image.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present invention.

If the functions are implemented in the form of computer software and are sold or used as an independent product, it may be considered, to a certain degree, that all or a part (for example, a part contributing to the prior art) of the technical solutions of the present invention are embodied in the form of a computer software product. The computer software product is generally stored in a computer readable nonvolatile storage medium and includes several instructions for instructing a computer device (which may be a personal computer, a server, a network device, or the like) to perform all or a part of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An image splicing method, comprising:
    acquiring a first image and a second image, wherein an overlapping region exists between the first image and the second image;
    determining a to-be-processed region within the overlapping region, wherein a region within the overlapping region except the to-be-processed region is a remaining region;
    acquiring a luminance component or chrominance component of each pixel of the remaining region, and obtaining a weight value of each adjacent pixel pair of the remaining region according to luminance components or chrominance components of all the pixels of the remaining region;
    setting a weight value of each adjacent pixel pair within the to-be-processed region, wherein a weight value of any adjacent pixel pair of the to-be-processed region is greater than a weight value of any adjacent pixel pair of the remaining region;
    determining a splicing path having the least seam line intensity of all splicing paths within the overlapping region as an optimal seam line, wherein the seam line intensity is a sum of weight values of all adjacent pixel pairs that the splicing path goes through; and
    performing image splicing on the first image and the second image along the optimal seam line.

2. The image splicing method according to claim 1, wherein the setting a weight value of each adjacent pixel pair within the to-be-processed region comprises:
    selecting the largest weight value of weight values of all the adjacent pixel pairs within the remaining region; and
    setting the weight value of each adjacent pixel pair within the to-be-processed region to be greater than the largest weight value.

3. The image splicing method according to claim 1, wherein the setting a weight value of each adjacent pixel pair within the to-be-processed region comprises:
    acquiring a luminance component or chrominance component of each pixel of the to-be-processed region, and obtaining a weight value of each adjacent pixel pair of the to-be-processed region according to luminance components or chrominance components of all the pixels of the to-be-processed region;
    selecting the largest weight value of weight values of all the adjacent pixel pairs within the remaining region and all adjacent pixel pairs within the to-be-processed region; and
    setting the weight value of each adjacent pixel pair within the to-be-processed region to be greater than the largest weight value.

4. The image splicing method according to claim 1, wherein the determining a to-be-processed region within the overlapping region comprises:
    determining the to-be-processed region according to a preset size within the overlapping region, wherein a size of the to-be-processed region is the same as the preset size.

5. The image splicing method according to claim 1, wherein the determining a to-be-processed region within the overlapping region comprises:
    determining a position and size of a face region in the first image, and determining a position and size of a face region in the second image; and
    determining the to-be-processed region within the overlapping region according to the position and size of the face region in the first image and the position and size of the face region in the second image.

6. An image splicing apparatus, comprising:
    a processor, and a computer readable storage medium storing computer executable instructions, the processor configured to execute the computer executable instructions which, when executed, configure the apparatus to:
    acquire a first image and a second image, wherein an overlapping region exists between the first image and the second image;
    determine a to-be-processed region within the overlapping region, wherein a region within the overlapping region except the to-be-processed region is a remaining region;
    acquire a luminance component or chrominance component of each pixel of the remaining region, and obtain a weight value of each adjacent pixel pair of the remaining region according to luminance components or chrominance components of all the pixels of the remaining region;

set a weight value of each adjacent pixel pair within the to-be-processed region, wherein a weight value of any adjacent pixel pair of the to-be-processed region is greater than a weight value of any adjacent pixel pair of the remaining region;

determine a splicing path having the least seam line intensity of all splicing paths within the overlapping region as an optimal seam line, wherein the seam line intensity is a sum of weight values of all adjacent pixel pairs that the splicing path goes through; and perform image splicing on the first image and the second image along the optimal seam line.

7. The image splicing apparatus according to claim 6, wherein the processor configured to execute the computer executable instructions which, when executed, configure the apparatus to:

select the largest weight value of weight values of all the adjacent pixel pairs within the remaining region; and set the weight value of each adjacent pixel pair within the to-be-processed region to be greater than the largest weight value.

8. The image splicing apparatus according to claim 6, wherein the processor configured to execute the computer executable instructions which, when executed, configure the apparatus to:

acquire a luminance component or chrominance component of each pixel of the to-be-processed region, and obtain a weight value of each adjacent pixel pair of the to-be-processed region according to luminance components or chrominance components of all the pixels of the to-be-processed region;

select the largest weight value of weight values of all the adjacent pixel pairs within the remaining region and all adjacent pixel pairs within the to-be-processed region; and set the weight value of each adjacent pixel pair within the to-be-processed region to be greater than the largest weight value.

9. The image splicing apparatus according to claim 6, wherein the processor configured to execute the computer executable instructions which, when executed, configure the apparatus to:

determine the to-be-processed region according to a preset size within the overlapping region, wherein a size of the to-be-processed region is the same as the preset size.

10. The image splicing apparatus according to claim 6, wherein the processor configured to execute the computer executable instructions which, when executed, configure the apparatus to:

determine a position and size of a face region in the first image, and determine a position and size of a face region in the second image; and determine the to-be-processed region within the overlapping region according to the position and size of the face region in the first image and the position and size of the face region in the second image.

* * * * *